(12) United States Patent
Simon

(10) Patent No.: US 6,949,129 B2
(45) Date of Patent: Sep. 27, 2005

(54) METHOD FOR MAKING RESIN BONDED ABRASIVE TOOLS

(75) Inventor: Mark W. Simon, Pascoag, RI (US)

(73) Assignee: Saint-Gobain Abrasives, Inc., Worchester, MA (US)

( * ) Notice: Subject to any disclaimer, the term of this patent is extended or adjusted under 35 U.S.C. 154(b) by 75 days.

(21) Appl. No.: 10/060,982

(22) Filed: Jan. 30, 2002

(65) Prior Publication Data

US 2003/0192258 A1 Oct. 16, 2003

(51) Int. Cl.$^7$ .............................. B24D 3/00; B24D 3/28; B24D 5/00; B24D 7/00; B24D 18/00
(52) U.S. Cl. ............................ 51/298; 51/307; 51/308; 51/309; 51/293
(58) Field of Search ......................... 51/307, 308, 309, 51/298, 295, 293

(56) References Cited

U.S. PATENT DOCUMENTS

| | | | |
|---|---|---|---|
| 3,323,885 A | | 6/1967 | Rowse et al. |
| 4,381,925 A | * | 5/1983 | Colleselli ..................... 51/298 |
| 4,918,116 A | | 4/1990 | Gardziella et al. .......... 523/149 |
| 5,042,991 A | | 8/1991 | Kunz et al. ................... 51/295 |

FOREIGN PATENT DOCUMENTS

AU        20356/67        10/1968

OTHER PUBLICATIONS

Grande, M., "How To Use Humidity Control In Heat Processing," *Process Heating*, pp. 22–24 (Apr. 2000).

Wang, X. M., et al., "Differential Scanning Colorimetry of the Effects of Temperature and Humidity On Phenol–Formaldehyde Resin Cure," *Polymer*, vol. 35, No. 26, pp. 5685–5692 (1994) . (no month).

Tonogai, S. et al., "Influence of Moisture Content on Curing Behavior of Two–Step Phenolic Molding Compounds," *Polymer Engineering and Science*, vol. 20, No. 17, pp. 1132–1137 (Nov. 1980).

* cited by examiner

*Primary Examiner*—Michael Marcheschi
(74) *Attorney, Agent, or Firm*—Mary E. Porter

(57) ABSTRACT

A method for producing organically bonded abrasive article includes combining an abrasive grain component and a phenol-based resin component. The combined components are molded and thermally cured in an atmosphere that comprises humidity, wherein the atmosphere contacts the molded components, thereby producing the organically bonded abrasive grain. The abrasive grain optionally can first be combined with an organosilicon compound, to form organosilicon-treated abrasive grain, and then with the phenol-based resin component. In one example, the phenol-based resin is thermally cured in the presence of steam. Abrasive articles produced by the method of the invention generally have improved properties under wet grinding conditions. In one example, an abrasive article produced by the method of the invention includes ammonia in an amount less than about 50 ppm. In another example, an abrasive grinding wheel produced by the method of the invention has a strength retention greater than about 57 percent.

21 Claims, No Drawings

METHOD FOR MAKING RESIN BONDED ABRASIVE TOOLS

BACKGROUND OF THE INVENTION

Bonded abrasive articles generally are characterized by a three dimensional structure in which abrasive grain is held in a matrix or bond. In some cases the bond is an organic bond, also referred to as a polymeric or resin bond. Organic bonded tools, however, often perform poorly under wet grinding conditions. Wet grinding strength retention is particularly poor in the case of some tools formed of alumina-based grain held in phenolic resin bonds. Abrasive wheels that include phenolic resin bonded abrasive grain designated as "38A" grain, for example, are known for rapid wheel wear in wet grinding, due, it is believed, to the highly water sensitive surface chemistry, i.e., rich $Na_2O$ content, in this type of abrasive grain. In the presence of water-based grinding fluid, unspent abrasive grain is prematurely released from the bond.

In one attempt to improve the wet performance of abrasive tools employing phenolic resin bonds, abrasive grains are treated with silanes, thereby rendering the grains hydrophobic. As reported, however, in U.S. Pat. No. 5,042,991, to Kunz, et al., this technique is accompanied by manufacturing difficulties and the improved performance of the grain diminishes after a few months of storage.

In another approach, disclosed in U.S. Pat. No. 3,323,885, wheel life is improved by preventing premature loss of useable grain from the bond; moisture is provided throughout the mass of a green wheel at the initial stage of the curing process, i.e., a relative humidity of at least 20% is maintained for at least five minutes at about 100° C. As the means for providing this relative humidity, the green wheel is wrapped in a moisture impermeable film prior to curing. While the resulting wheels have improved wheel life, the steps of wrapping and unwrapping each wheel add to the manufacturing cost of bonded abrasive tools. In addition, the film prevents the escape of undesirable reaction products, such as ammonia, which remain trapped within the body of the finished article. In the absence of wrapping, water vapor is driven off and evaporates as the green body is heated above 100° C.

Therefore, a need exists for organic bonded abrasive articles and methods of producing them that reduce or minimize the above-mentioned problems.

SUMMARY OF THE INVENTION

The present invention generally is related to organically bonded abrasive articles, such as grinding wheels, wheel segments and others and to methods for producing them.

In one embodiment, the invention is directed to a method for producing an organically bonded abrasive article that includes combining an abrasive grain component, and a phenol-based resin component. The combined components are molded. The phenol-based resin component is thermally cured in an atmosphere that comprises humidity, thereby forming the organically bonded abrasive article. The atmosphere comprising humidity contacts the molded components.

The invention also is directed to an abrasive article produced by a method that includes combining an abrasive grain component, and a phenol-based resin component and molding the combined components. The phenol-based resin component is thermally cured in an atmosphere comprising humidity, wherein the atmosphere contacts the molded components.

In one example, the atmosphere comprising humidity is obtained by directing steam into the chamber employed to conduct the thermal cure. In a preferred embodiment, the abrasive grain is first combined with an organosilicon component to form organosilicon-treated abrasive grain, followed by combining the phenol-based resin component and the organosilicon-treated abrasive grain.

In another embodiment, the invention is directed to an abrasive wheel produced by the method of the invention and having a strength retention greater than 57%. In another embodiment, the invention is directed to an abrasive article, produced by the method of the invention and having an amount of ammonia present in the wheel that is less than about 50 parts per million (ppm).

The invention has many advantages. For example, the invention eliminates the need for the wrapping and unwrapping steps in manufacturing grinding wheels. Moreover, the amount of ammonia and other undesirable reaction products trapped in the body of the wheel during manufacturing is reduced. Abrasive tools obtained by carrying out the invention generally have good wet strength retention, i.e., abrasive grains are retained by the organic bond for the duration of their usable life under wet grinding conditions. The invention is particularly advantageous in providing wet strength retention in soft grade abrasive wheels. "Soft grade abrasive wheels," as defined herein, means wheels having a grade softer than grade Q on the Norton Company grade scale. Abrasive tools fabricated by the methods of the invention also have good dry strength retention and low deterioration in grinding performance.

DETAILED DESCRIPTION OF THE INVENTION

The foregoing and other objects, features and advantages of the invention will be apparent from the following more particular description of preferred embodiments of the invention. A description of preferred embodiments of the invention follows.

The present invention is related to a method for producing organically bonded abrasive articles.

The method of the invention includes combining an abrasive grain component, and a phenol-based resin component. The combined components can be molded, e.g., into a green body in a shape suitable for forming an abrasive article. The phenol-based resin component is thermally cured in an atmosphere that comprises humidity and that contacts the molded components.

In one embodiment, the abrasive grain component employed by the method of the invention includes alumina-based abrasive grains. As used herein, the term "alumina," "$Al_2O_3$," and "aluminum oxide" are used interchangeably. Many alumina-based abrasive grains are commercially available and special grains can be custom made. Specific examples of suitable alumina-based abrasive grains which can be employed in the present invention include white alundum grain, designated as "38A grain," from Saint Gobain Ceramics & Plastics, Inc. or pink alundum, designated as "86A grain," from Treibacher Schleifmittel, A G. Other abrasive grains such as, for example, seeded or unseeded sintered sol gel alumina, with or without chemical modification, such as rare earth oxides, MgO, and the like, alumina-zirconia, boron-alumina, silicon carbide, diamond, cubic boron nitride, aluminum-oxynitride, and combinations of different abrasive grains also can be employed.

The size of abrasive grains often is expressed as a grit size, and charts which show a relation between a grit size and its corresponding average particle size, expressed in microns or inches, are known in the art as are correlations to the corresponding United States Standard Sieve (USS) mesh size. Grain size selection depends upon the grinding application or process for which the abrasive tool is intended. Suitable grit sizes that can be employed in the present invention range from about 16 (corresponding to an average size of about 1660 µm) to about 320 (corresponding to an average size of about 32 µm).

The $Al_2O_3$ grain preferably is coated with an organosilicon before making the abrasive article. Suitable organosilicon components include organo-functional silanes, such as typically are employed as coupling agents. Particularly preferred are aminosilanes, for instance, gamma-aminopropyltriethoxysilane. Other examples of organosilicon compounds that can be employed include, but are not limited to, vinyltriethoxysilane, gamma-aminopropyltrimethoxysilane, diaminopropylethoxysilane.

The phenol-based resin component includes at least one phenolic resin. Phenolic resins generally are obtained by polymerizing phenols with aldehydes, in particular, formaldehyde, paraformaldehyde or furfural. In addition to phenols, cresols, xylenols and substituted phenols can be employed. Resoles generally are obtained by a one step reaction between aqueous formaldehyde and phenol in the presence of an alkaline catalyst. Novolac resins, also known as two-stage phenolic resins, generally are produced under acidic conditions and in the presence of a cross-linking agent, such as hexamethylenetetramine (also referred to herein as "hexa").

Either a resole or a novolac resin can be used. More than one phenol-based resin can be employed. In one embodiment, the phenol-based resin component includes at least one resole and at least novolac-type phenolic resin. Preferably, at least one phenol-based resin is in liquid form. Suitable combinations of phenolic resins are described, for example, in U.S. Pat. No. 4,918,116 to Gardziella, et al., the entire contents of which are incorporated herein by reference.

In a preferred embodiment, the abrasive grain component is first combined with the organosilicon component. Methods for treating abrasive grains with an organosilicon compound are known in the art. For instance, abrasive grains can be wetted, sprayed or dispersed into a solution containing a suitable organosilicon compound to coat the grain. The coated grain generally is dried prior to use.

The organosilicon-treated abrasive grain is then combined with the phenol-based resin component. In one example, organosilicon-treated abrasive grain is first combined with one or more phenol-based resin(s) in liquid form and then with one or more phenol-based resin(s) in powder form. In another example, both liquid and powder phenol-based resins are added simultaneously to the organosilicon-treated abrasive grain.

The organosilicon-treated abrasive grain and phenol-based resin component are combined by a suitable method, such as by blending in a suitable mixer. An example of a suitable mixer is an Eirich mixer, e.g., Model RV02, a Littleford or a bowl-type mixer.

In other embodiments, the organosilicon component is first combined with the phenol-based resin component and then with the abrasive grain component. For example, the organosilicon component can be combined with one or more liquid phenol-based resin(s). In yet other embodiments, all components are combined in one step. Methods for combining the components are known in the art.

Additional ingredients, such as, for example, fillers, curing agents and other compounds typically used in making organic-bonded abrasive articles also can be included. Fillers may be in the form of a finely divided powder, as granule, sphere, fiber or some other shaped piece. Examples of suitable fillers include sand, silicon carbide, bubble alumina, bauxite, chromites, magnesite, dolomites, bubble mullite, borides, fumed silica, titanium dioxide, carbon products (e.g., carbon black, coke or graphite), wood flour, clay, talc, hexagonal boron nitride, molybdenum disulfide, feldspar, nepheline syenite and various forms of glass such as glass fiber and hollow glass spheres. Generally, the amount of filler is in the range of from about 0.1 and about 30 parts by weight, based on the weight of the entire composition.

Cross-linking agents employed in curing phenol novolac resins include hexa and other curing agents known in the art. Precursors of such materials, such as for example, ammonium hydroxide also can be employed. Suitable amounts of curing agent are employed, such as between about 5 and about 20 parts by weight of curing agent per hundred parts of total phenol novolac resin.

Other materials that can be added include processing aids, such as: antistatic agents; metal oxides, such as lime, zinc oxide, magnesium oxide; lubricants, such as stearic acid and glycerol monostearate and mixtures thereof. The appropriate amount of each of these materials also can be determined by those skilled in the art.

In one embodiment, a green body is formed by placing the combined components into an appropriate mold for pressing. As used herein, the term "green" refers to a body which maintains its shape during the next process step, but generally does not have enough strength to maintain its shape permanently; resin bond present in the green body is in an uncured or unpolymerized state. The combined components can be molded in the shape of the desired article. For instance, the combined components can be molded in the shape of wheels, discs, wheel segments, stones and hones. In a preferred embodiment, the combined components are molded and pressed in a shape suitable for a grinding wheel. Shaped plungers can be used to cap off the mixture, as known in the art.

To produce the abrasive articles of the invention, the phenol-based resin component of the green body is thermally cured, i.e., polymerized, in an atmosphere comprising humidity. As the green body is heated, physical and chemical processes take place, e.g. thermoset phenol-based resins are cross-linked, thereby forming the abrasive article.

Generally, the green body is controllably heated in a step-wise manner to a final cure temperature. The entire process generally is referred to as the "cure" or "bake" cycle. Generally, large green bodies are heated slowly in order to cure the product evenly, by allowing for the heat transfer process to take place. "Soak" stages may be used at given temperatures to allow the wheel mass to equilibrate in temperature during the heating ramp-up period prior to reaching the temperature at which the phenol-based resin is polymerized. A "soak" stage refers to holding the molded components, e.g., green body, at a given temperature for a period of time. The green body also is heated slowly, e.g., from room (ambient) temperature to a soak temperature in order to permit the slow (controlled) release of volatiles generated from by-products of the cure from the grinding wheel.

For instance, the green body may be pre-heated to an initial temperature, e.g., about 100° centigrade (C.), where it is soaked, for instance, for a time period, from about 0.5 hours to several hours. Then the green body is heated, over a period of time, e.g. several hours, to a final cure temperature. As used herein, the term "final cure temperature is the temperature at which the molded article is soaked to effect polymerization, e.g., cross-linking, of a phenol-based resin component, thereby forming an abrasive article. As used herein, "cross-linking" refers to the chemical reaction(s) that take(s) place in the presence of heat and generally in the presence of a cross-linking agent, e.g., hexa, whereby a phenol-based resin component hardens. Generally, the molded article is soaked at the final cure temperature of the cure cycle for a period of time, e.g., between 10 and 36 hours, or until the center of mass of the molded article reaches the cross-linking temperature and hardens.

The final cure temperature employed depends on the resin composition. Polymerization of phenol based resins generally takes place at a temperature in the range of between about 110° C. and about 225° C. Resole resins generally polymerize at a temperature in a range of between about 140° C. and about 225° C. and novolac resins generally at a temperature in a range of between about 110° C. and about 195° C. The final cure temperature also can depend on other factors such as, for example, the size and/or shape of the article, the duration of the cure, the exact catalyst system employed, wheel grade, resin molecular weight and chemistry, curing atmosphere and others. For several suitable phenol-based components described herein, the final cure temperature is at least about 150° C.

Thermal curing, i.e., polymerization, of the phenol-based resin component is conducted in an atmosphere comprising humidity, i.e, an atmosphere that has a relative humidity, R.H., that exceeds the normal R.H. at a given temperature. As used herein, relative humidity percent, "R.H. %" refers to the ratio of the actual concentration of water vapor in a gas, e.g., air, nitrogen, at a given temperature and the concentration of water at saturation, in the same gas and at the same temperature. The atmosphere comprising humidity contacts the green body, i.e., the surface of the green body is not wrapped in a barrier material, such as a water impermeable film, but is exposed to the atmosphere that comprises humidity, or water vapor. In addition to water vapor, the atmosphere comprising humidity can further include air or another suitable gas, such as, for example, nitrogen. The atmosphere that comprises humidity can also include water droplets, ammonia gas, carbon dioxide gas and other components.

Preferably, thermal curing is conducted at a maximum relative humidity percent (R.H. %) obtainable at the final cure temperature. In practice, the actual R.H. % obtained at a given temperature often is somewhat less than the theoretical R.H. %. For instance, at a temperature of 150° C., the theoretical maximum R.H. % at a pressure of 1 atmosphere is 21.30%. Output R.H. % in a suitable humidity oven is between about 18% to about 20%, resulting in a difference of about 5–15% with respect to the theoretical maximum R.H. %. Preferably, thermal curing is conducted at a maximum relative humidity percent (R.H. %) obtainable at the final cure temperature. In air, at least 85–90% of the maximum theoretical R.H. % generally is preferred.

Thermal curing also can be conducted in an atmosphere comprising humidity by employing less R.H. % than the maximum obtainable R.H. % at a given temperature. For example, 40%–50% less than the maximum obtainable R.H. %, at the temperature of the thermal cure, in air, has been found to improve the operation, under wet conditions, of tools produced by the method of the invention.

The atmosphere comprising humidity can be present for the entire period during which the phenol-based resin component polymerizes, thereby forming the abrasive article. It also can be present for less time. For instance, for cure cycles employing 23 to about 36 hours to effect polymerization of the phenol-based resin component and formation of the abrasive article, an atmosphere comprising humidity can be provided for about 5 to about 16 hours, respectively. It can be provided for as little as 35% of the period employed to cure the resin component at the maximum cure temperature.

An atmosphere comprising humidity also can be present prior to thermally curing the green body, e.g., during preheating, and/or during heating from the initial cure temperature to the temperature at which the phenol-based resin component is thermally cured. Processes in which the atmosphere comprising humidity is present throughout the entire cure cycle, i.e., from room temperature to the final cure temperature and throughout the duration of the final cure temperature, are preferred. Furthermore, an atmosphere comprising humidity also can be present during cooling of the abrasive article, e.g. during the time that the oven temperature is reduced to about 100° C. Different levels of R.H. %, at different stages of the cure cycle, can be employed.

Thermal curing the phenol-based resin component in an atmosphere comprising humidity can be in a sealed chamber, in the presence of a known quantity of water introduced in the chamber prior to curing. The known quantity of water can further comprise dissolved gases, such as, for instance, ammonia or carbon dioxide, and/or dissolved metal salts, e.g., metal halides, carbonates, acetates, metal hydroxides, metal complexes and other compounds. It can also include aqueous phenolic resoles, acrylics and others.

Other techniques for generating an atmosphere comprising humidity in a sealed chamber, include, for example, employing adsorbents capable of liberating water at elevated temperature, e.g., hydrated zeolites, water-adsorbing molecular sieve materials, hydrated silica, hydrated alumina and others. Metal salts and metal complexes that contain bound water also can be enclosed in a sealed chamber to generate an atmosphere comprising humidity during thermal curing.

Thermally curing the phenol-based resin component in an atmosphere comprising humidity also can be conducted by directing steam into a self contained chamber. For example, a curing oven or autoclave can be provided with conduits for injecting live steam. As used herein "live steam" refers to steam from a steam source outside the curing chamber, for instance, from a steam generator. In one example, the chamber is sealed and operated at a slight internal pressure, e.g. in a range from atmospheric to about less than 2 pounds per square inch gauge (psig). The chamber also can be provided with means for recirculating the steam to promote uniform humidity throughout the chamber. Suitable means for recirculating steam include pumps, fans, condensers, baffles/tubing, and others known in the art.

The chamber can be, for example, a chamber in an electric oven, making possible curing in a high humidity environment without interfering with the performance of the electric oven and safeguarding against damage to electrical circuitry. For instance, the chamber can be equipped with a perforated plate to disperse steam uniformly. It can be provided with an adjustable damper at the exhaust line, to control air turn-over inside the chamber, inlet ports for air intake, and introduction of thermocouples and humidity sensors and controllable steam intake valves. Steam chambers large enough to cure full size organic wheels, e.g., of up to 860 millimeters (mm) in diameter, can be employed.

In one embodiment, live steam is employed, alone, or in combination with other techniques known in the art, to heat the green body, for instance, to the final cure temperature or a temperature below the final cure temperature. Live steam can be applied to a green body after the air temperature of the environment surrounding the wheel reaches a least 80° C., thereby minimizing condensation of steam vapor on the walls of the chamber during the initial temperature ramp. Steam exiting the discharge line is approximately 110° C. in temperature, and external heat is applied to raise the temperature of the cure environment to the final soak temperature.

Thermal curing the phenol-based resin component in an atmosphere comprising humidity also can be conducted in a humidity controlled oven. Suitable examples of humidity controlled ovens are described for example by M. Grande, "Process Heating," pp 22–24 (April 2000). Both mist and steam water injection can be employed. Steam injection humidity-controlled ovens are preferred. A suitable commercial humidity-controlled oven is commercially available from Despatch Industries, Minneapolis, Minn. Commercial humidity ovens generally are provided with profiles for the maximum R.H. % obtainable at the oven operation temperatures.

Since the green body is in contact or exposed to the atmosphere, i.e., its surface is not wrapped in a water impermeable film, water in the curing atmosphere can circulate in and out of the green body and products of the reactions taking place during its heating and soaking can escape; amounts of reaction products, such as, for instance, ammonia, trapped within the finished article are reduced when compared to amounts found in articles manufactured by wrapping. A method for measuring ammonia content in an abrasive article is the Total Kjeldahl Nitrogen (TKN) method described in EPA Method 351.3.

In one embodiment, an abrasive article, e.g., a grinding wheel, manufactured by the method of the invention, has a strength retention greater than 57%. In another embodiment, ammonia is present in an article produced by the method of the invention in an amount that is less than 50 ppm.

In a preferred embodiment, the method of the invention is employed to produce abrasive wheels that have an open pore structure. Generally, such wheels will have an open porosity preferably ranging from about 20 to about 40 percent by volume, and optionally from 2 to about 60 volume percent.

Without being held to any particular interpretation of the chemical mechanism of the invention, it is believed that water molecules disrupt attachment to the grain surface of some of the functional groups of the organosilicon compound, while leaving a portion of the organosilicon compound bonded to the surface of the abrasive grain. In the case of amino-functional silanes, for instance, the presence of water frees the amino end of the silane. During curing, an amino ($-NH_2$) group reacts with the hydroxy ($-OH$) group of the phenol-based resin, thereby providing a strong interface between the abrasive grain and the organic bond.

Furthermore, the addition of water during curing may also have an effect on the equilibrium reaction for cross-linking of the resole. It is believed that the presence of water may inhibit the cross-linking reaction to some degree, thereby providing additional free alkylhydroxy, (e.g., $-CH_2OH$) groups available for reacting with an aminosilane, e.g., aminopropyl silane. In the case of novolac resins it is believed that water catalyzes the hydrolysis of hexa. This is a necessary process for the cross-linking reaction between hexa and novolac resins, resulting in increased cross-linking density. It is believed that novolac resins having increased cross-link density may be less susceptible to attack by water.

In addition, it is believed that levels of ammonia in wheels manufactured by the methods of the invention are greatly reduced and that, in turn, this also results in increased wheel life as well as in a longer lasting coolant solution. Ammonia is a bi-product of the novolac cure reaction and is generated during the resin cure process. Ammonia is detrimental in wet grinding because it raises the pH of coolant solutions, which subsequently promotes degradation of the grinding wheel by accelerating the hydrolytic breakdown of the resin/abrasive interface, resulting in decreased wheel life. Conventional methods of curing wheels in closed environments, e.g., wrapped in a film, cause ammonia to be trapped in the wheel as it is cured. In the method described herein, curing is in an open environment, i.e., the green body is exposed to the curing atmosphere, thus allowing ammonia gas to vaporize out of the wheel, as it hardens.

The invention is further described by the following examples, which are not intended to be limiting.

EXEMPLIFICATION

Example 1

Eleven control samples were prepared using abrasive grain designated "38A," obtained from Saint-Gobain Ceramics and Plastics, Inc., Worcester, Mass. This abrasive grain is a white, friable alundum, known to have poor strength retention when used in wet grinding processes. Aminopropyltriethoxysilane was obtained from Witco Corp., Greenwich Conn. Liquid phenolic resin (LPR), was obtained from Oxychem-Durez, Buffalo, N.Y. Two dry phenolic resin bonds, A and B, obtained from Oxychem-Durez, Buffalo, N.Y. were employed containing 9% hexa. Both resins were wetted with decyl alcohol (TDA) (20 $cm^3$/lb) dry resin to control dust. Both bond A and bond B had a medium flow and medium molecular weight.

Specifications #1A and #1B, employing, respectively, bond A and bond B had the following compositions and properties:

| BOND A Specification #1A | |
|---|---|
| COMPONENT | WEIGHT (g) or VOLUME ($cm^3$) |
| Abrasive, alumina 60 grit (406 microns) | 455.8 g |
| Aminopropyl triethoxy silane, 2% (v/v) in water | 8 $cm^3$ |
| LPR | 8.6 g |
| BOND A (rubber modified phenolic resin)* | 34.5 g |
| decyl alcohol (TDA) | 20 $cm^3$/lb resin |

-continued

| Properties | Values |
|---|---|
| Specimen density | 2.249 g/cm$^3$ |
| Specimen Grade & Structure | I-6 |

*Oxychem-Durez 29-717, rubber modified (18% nitrile rubber) phenolic resin containing 7.5% hexamethylenetetramine (HEXA)

BOND B Specification #1B

| COMPONENT | WEIGHT (g) or VOLUME (cm$^3$) |
|---|---|
| Abrasive, alumina 60 grit (406 microns) | 455.8 g |
| Aminopropyl triethoxy silane, 2% (v/v) in water | 8 cm$^3$ |
| LPR | 8.6 g |
| BOND B (unmodified phenolic resin)* | 34.5 g |
| TDA | 20 cm$^3$/lb resin |
| Properties | Values |
| Specimen density | 2.249 g/cm$^3$ |
| Specimen grade & structure | I-6 |

*Oxychem-Durez 29-346, unmodified phenolic resin containing 9% hexamethylenetetramine (HEXA)

Mixes were molded into either sticks or test wheels. The dimensions of the test sticks were 4.0" (101.60 mm) by 1.0" (25.40 mm) by 0.5" (12.70 mm). Test wheels were 5.125" (130.175 mm) by 1.0" (25.40 mm) by 0.4" (10.16 mm). A mix weight of 74.8 g was used to make the test bars molded.

To simulate wrapping, as described in U.S. Pat. No. 3,323,885 to Rowse, et al., sample articles were placed in a container and the container was sealed with paper tape after molding and prior to heating. No water was added to the container prior to thermally curing the phenol-based resin component.

The green control samples were cured in an oven by controllably increasing the temperature from room temperature to 160° C. and holding at 160° C. for 10 hours.

Flexural strength measurements (ASTM D790-91) were conducted using a three point bend test and a 2" span and a 0.1"/minute cross head speed. Both dry and wet strengths for each sample were determined by collecting a total of 6 to 8 data points for each sample. Data reported in Table 1 are averages flexural strengths ($\bar{\sigma}$) and corresponding standard deviations, s.d. The results for each of the eleven samples and the average results for the eleven samples are shown in Table 1.

TABLE 1

Wet & Dry Flexural Strength of Control Samples

| # | Ave. Dry Strength σ (MPa) | s.d. | Ave. Wet Strength σ (MPa) | s.d. | % Wet Strength Retention | s.d. |
|---|---|---|---|---|---|---|
| 1 | 35.1 | 1.1 | 13.3 | 0.6 | 37.9 | 5.5 |
| 2 | 41 | 1.6 | 21.1 | 0.5 | 51.5 | 4.6 |
| 3 | 30.3 | 2 | 15 | 0.5 | 49.5 | 7.4 |
| 4 | 32 | 1.3 | 17 | 0.8 | 53.1 | 6.2 |
| 5 | 35.9 | 2.4 | 13 | 0.5 | 36.2 | 7.7 |
| 6 | 32.2 | 1.3 | 17 | 0.8 | 52.8 | 6.2 |
| 7 | 35.1 | 2.3 | 12.5 | 0.8 | 35.6 | 9.2 |
| 8 | 35.4 | 2.5 | 15 | 0.4 | 42.4 | 7.5 |
| 9 | 38.7 | 2.4 | 12.9 | 0.3 | 33.3 | 6.6 |
| 10 | 34.8 | 1.6 | 13 | 1 | 37.4 | 9.0 |
| 11 | 35.9 | 2.4 | 13 | 0.5 | 36.2 | 7.7 |
| Average | 35.1 | 1.9 | 14.8 | 0.6 | 42.4 | 7.1 |

Example 2

Green test bars prepared as described in Example 1 were set in a sealed container in the presence of 10, 25 and 75 cubic centimeters (cm$^3$ or cc) of water. The water was added to a small metal pan and placed in the bottom of the container. The test bars were placed on solid ceramic batts above the water pan. Vaporization of steam throughout the container could be achieved readily during curing. The effect of water concentration during curing (partial pressure of steam) on wet strength was evaluated by adjusting the volume of water in the container during curing. Based on results from test bars, a sufficient amount of water was used to maximize wet strength. Cure conditions were the same as described in Example 1, except that moisture was present throughout curing.

Dry and wet flexural strength, as well as percent strength retention of samples prepared according to the invention, at different levels of water concentration are shown in Table 2 below. Comparison data is provided by Samples #2,3,6 and 11 reported in Table 1, which were cured without water being added.

TABLE 2

Effect of Water Concentration (Partial Pressure of Steam) on Wet Flexural Strength

| Sample Variation | Dry Strength σ (MPa) | s.d. | Wet Strength σ (MPa) | s.d. | % Wet Strength Retention | s.d. |
|---|---|---|---|---|---|---|
| Sample #2 | 41 | 1.6 | 21.1 | 0.5 | 51.5 | 4.6 |
| 10 cc H2O | 37.8 | 1.5 | 25.3 | 1.3 | 66.9 | 6.5 |
| Sample #3 | 30 | 2 | 15 | 0.5 | 50.0 | 7.5 |
| 25 cc H2O | 33.1 | 2.3 | 30.9 | 1 | 93.4 | 7.7 |
| Sample #6 | 32 | 1.3 | 17 | 0.8 | 53.1 | 6.2 |
| 25 cc H2O | 33.7 | 1.3 | 30.3 | 0.9 | 89.9 | 4.9 |
| Sample #11 | 35.9 | 2.4 | 13 | 0.5 | 36.2 | 7.7 |
| 75 cc H2O | 35.9 | 1.5 | 33.9 | 1.2 | 94.4 | 5.5 |

Example 3

The effects of humidity also were studied by introducing steam at a pressure of one atmosphere to the oven during curing.

Recipes for preparing these samples are reported in Example 1, where Specification #1A used a rubber-modified phenolic resin and Specification #1B used an unmodified phenolic resin.

Green test bars, having the composition described in Example 1, were placed on a wire screen and suspended above water placed in the bottom of a 10 gallon nonpressurized kettle reactor. The vented, covered vessel containing the test bars and about 1.5 gallons of water was placed in the oven for the cure. Humidity was present throughout the cycle. Temperatures and durations were as described in Example 1, except that following the cure, residual water remained in the pan, indicating that water saturated atmosphere was achieved throughout the cure including the soak at the final cure temperature (a depletion of water did not occur through the duration of the cure cycle).

Results are shown in Table 3 and compared to the average of Samples 1 through 11 shown in Table 1.

TABLE 3

Effect of Atmospheric Moisture (Steam) on Wet Flexural Strength: 1 atm (non-pressurized kettle reactor)

| Effect of Moisture-Induced Cure Vs. Resin Type | Dry Strength σ (MPa) | s.d. | Wet Strength σ (MPa) | s.d. | % Wet Strength Retention | s.d. |
|---|---|---|---|---|---|---|
| Control No moisture added (obtained from Table 1) | 35.1 | 1.9 | 14.8 | 0.6 | 42.4 | 7.1 |
| Humidity Cure Bond A, Specimen #1A | 29.4 | 1.1 | 28.8 | 2 | 98.0 | 7.9 |
| Humidity Cure Bond B, Specimen #1B | 29.5 | 1.7 | 26.7 | 1.7 | 90.5 | 8.6 |

Example 4

The % RH as well as duration of humidity control during curing were studied using test slugs of 6-3/16"×3-3/8". The green slugs were prepared as described in Example 1, employing the rubber modified dry resin (Bond A) described in Example 1.

A control sample was prepared as described in Example 1. Seventeen green samples were cured in the presence of moisture at a pressure of 1 atmosphere in a Despatch Model 519 environmental chamber manufactured by Despatch Industries, Minneapolis, Minn.

It is noted that at elevated temperatures, R.H. values drop exponentially as a function of temperature above 100° C. Therefore, the % R.H. values used as a set point are not achieved as the temperature rises above 100° C. throughout the cure cycle. For example, relative humidity percent dropped from 90% to 15% at 160° C., even though a set point of 90% was employed. Maximum achievable R.H. values as a function of temperature are reported in Table 4A for temperatures greater than the boiling point of pure water (100° C.). These values are theoretical, and were calculated based upon the vapor pressure of water throughout the temperature range.

Water vapor table may be found in CRC Handbook of Chemistry and Physics, Vol. 76, pg. 6–15, CRC Press, Boca Raton, Fla. This represents the first 3 columns of Table 4A, below. The 4$^{th}$ column in Table 4A (RH, %) was calculated based on the following relationship:

$$RH=(p/p_o)\times100\% \text{ or } RH=1/p_o\times100\%$$

where p is the pressure of the system (assumed to be 1 atm) and $P_o$ is the vapor pressure of water at a given temperature (this value is reported in Column 3 of the table).

Humidity profile of the oven varied with temperature. Maximum R.H. obtainable at a given temperature in the ovens can be found in the Oven Temperature/Humidity Profile Table.

TABLE 4A

Theoretical Maximum Relative Humidity as a Function of Temperature (Calculated based upon the vapor pressure of water at temperature, T)

| Temp (° C.) | $p_o$ (kPa) | $p_o$ (atm) | RH (%) |
|---|---|---|---|
| 100.00 | 101.32 | 1.00 | 100.00 |
| 105.00 | 120.79 | 1.19 | 83.89 |
| 110.00 | 143.24 | 1.41 | 70.74 |
| 115.00 | 169.02 | 1.67 | 59.95 |
| 120.00 | 198.48 | 1.96 | 51.05 |
| 125.00 | 232.01 | 2.29 | 43.67 |
| 130.00 | 270.02 | 2.66 | 37.53 |
| 135.00 | 312.93 | 3.09 | 32.38 |
| 140.00 | 361.19 | 3.56 | 28.05 |
| 145.00 | 415.29 | 4.10 | 24.40 |
| 150.00 | 475.72 | 4.69 | 21.30 |
| 155.00 | 542.99 | 5.36 | 18.66 |
| 160.00 | 617.66 | 6.10 | 16.40 |
| 165.00 | 700.29 | 6.91 | 14.47 |
| 170.00 | 791.47 | 7.81 | 12.80 |
| 175.00 | 891.80 | 8.80 | 11.36 |
| 180.00 | 1001.90 | 9.89 | 10.11 |

Experiments were carried out by varying either the relative humidity and maintaining humidity for the complete cure cycle or by varying the length of time the samples were exposed to maximum humidities during the cure. The length of time for exposing samples to humidity ranged from 5 hours up to 15 hours for the full cure cycle. In experiments where a set point of 90% R.H. maximum humidity was obtained in the system for the specified duration of time. The data are reported in Tables 4B and 4C.

TABLE 4B

Effect of Duration of Humidity Control During Bake Cycle on Wet Flexural Strength at Constant Relative Humidity (Maximum Obtainable at a given Temperature*)

| | Conditions | | | Dry | Wet | % |
|---|---|---|---|---|---|---|
| Run # Sample | Time (hrs) | Temp ° C. | % Cycle | Strength (MPa) | Strength (MPa) | Strength Retained |
| 1 | 5 | 135 | 33 | 33.2 | 11.3 | 34 |
| 2 | 5.6 | 140 | 100 | 28.6 | 17.5 | 61 |
| 3 | 6 | 120 | 35 | 27.6 | 13.8 | 50 |
| 4 | 7.5 | 135 | 40 | 29.5 | 17 | 58 |
| 5 | 7.5 | 160 | 50 | 32.2 | 18.6 | 58 |
| 6 | 11 | 160 | 75 | 31.9 | 19.8 | 62 |
| 7 | 14 | 160 | 93 | 13.3 | 9.2 | 69 |
| 8 | 15 | 160 | 100 | 29.7 | 22.3 | 75 |
| 9 | 23 | 160 | 100 | 29.3 | 21.2 | 72 |
| Control | | 160 | | 32.9 | 11.6 | 35 |

*Humidity profile varied with temperature. Maximum R.H. obtainable at a given temperature in these ovens can be found in the Oven Temperature/Humidity Profile Table.

TABLE 4C

Effect of Percent Relative Humidity on Wet Flexural Strength (Maximum Obtainable at a given Temperature*) using Humidity Control for Entire Bake Cycle

| Run # Sample | Conditions Time | Temp | % Cycle | Setpoint* Humidity | Dry Strength (MPa) | Wet Strength (MPa) | % Strength Retained |
|---|---|---|---|---|---|---|---|
| 1 | 15 h | 160 | 100 | 30 | 28.3 | 7.5 | 27 |
| 2 | 15 h | 160 | 100 | 40 | 32.1 | 11.5 | 36 |
| 3 | 15 h | 160 | 100 | 50 | 29 | 12.6 | 43 |
| 4 | 15 h | 160 | 100 | 60 | 31.5 | 18.6 | 59 |
| 5 | 15 h | 160 | 100 | 75 | 28.6 | 20.2 | 71 |
| 6 | 15 h | 160 | 100 | 90 | 29.7 | 22.3 | 75 |
| 7 | 15 h | 170 | 100 | 90 | 20.9 | 14.2 | 68 |
| Control | | 160 | | | 32.9 | 11.6 | 35 |

*Humidity profile varies with temperature. Maximum R.H. obtainable at a given temperature in these ovens can be found in the Oven Temperature/Humidity Profile Table.

The results indicated that relative humidity and duration of exposure to humidity, when increased, resulted in improved properties. Optimum conditions were at the highest humidity obtainable in the oven for a given temperature, for the duration of the cure cycle. Wet flexural strength measurements for samples cured under optimized conditions were greater than twice the wet strength of the control sample.

Example 5

Standard wheels were molded to 5.125" (130.175 mm)×0.40" (10.16 mm)×1.0" (25.4 mm) for a finished size of 5.0" (127.00 mm)×0.200" (5.08 mm)×1.25 (31.75 mm). The wheels were fabricated employing the grain, silane, resole and dry bond A described in.

The bond system employed for this test is shown below:

Three different wheel specifications in various grades (H, J, L), all including this dry bond, were formed and they are described below.

Example 1.

Two specimens tested, #3A and #4A, had the compositions and properties shown below:

Bond A, Specimen #3A

| COMPONENT | WEIGHT (g) or VOLUME (cm³) |
|---|---|
| Abrasive, alumina 60 grit (406 microns) | 455.8 g |
| Aminopropyl triethoxy silane, 2% (v/v) in water | 8 cm³ |
| LPR | 8.6 g |
| BOND A (rubber modified phenolic resin) | 34.5 g |
| TDA | 20 cm³/lb resin |

| Properties | Values |
|---|---|
| wheel density | 2.249 g/cm³ |
| wheel grade & structure | I-6 |

| Composition | Volume % |
|---|---|
| Abrasive | 52 |
| Bond | 30 |
| Porosity | 18 |

Bond A, Specimen #4A

| COMPONENT | WEIGHT (g) or VOLUME (cm³) |
|---|---|
| Abrasive, alumina 60 grit (406 microns) | 449.4 g |
| Aminopropyl triethoxy silane, 2% (v/v) in water | 9 cm³ |
| LPR | 9.9 g |
| BOND A (rubber modified phenolic resin) | 39.7 g |
| TDA | 20 cm³/lb resin |

| Properties | Values |
|---|---|
| wheel density | 2.281 g/cm³ |
| wheel grade & structure | K-6 |

| Composition | Volume % |
|---|---|
| Abrasive | 52 |
| Bond | 36 |
| Porosity | 12 |

The wheels were cured by controllably increasing the temperature from room temperature to 160° C. for 10 hours.

Standard wheels were stacked on individual ceramic batts and sealed in a vessel (can) without the addition of water and were cured under dry conditions. These wheels were the control wheels.

Humidity Cured-(steamed) green wheels were set on individual batts after molding in a sealed vessel containing 0.25 L water to evaluate the effect of wheels thermally cured under high relative humidity.

Initially water saturated wheels were saturated by soaking in water (approximately 10 wt % water/wheel weight) prior to the cure and set on open batts in the oven in order to evaluate the effect of high humidity during the early stages of the cure cycle only. No additional water was added and thermal curing was in the absence of humidity.

Surface grinding tests were carried out, under the machine set-up conditions shown below, where F.P.M. stands for feet per minute.

| | |
|---|---|
| Machine | Brown & Sharpe Surface Grinder |
| Wheel Speed | 5730 R.P.M. (7500 S.F.P.M.) |
| Table Traverse | 50 F.P.M. (15240 mm/min) |
| Unit Crossfeed | 0.180 IN |
| Unit/Total Downfeed | 1.0 mm/50 mm 54340 steel removed |
| | 2.0 mm/50 mm 4340 steel removed |
| Pre-Grind | 1.0 mm/30 mm 4340 steel removed |
| | 2.0 mm/30 mm 4340 steel removed |
| Material Type | 4340 steel |
| Rockwell Hardness | 48 Rc |
| Diamond Point Dresser | 0.025 mm dress depth |
| Coolant | Master Chemical Trim SC210 semi-synthetic, 5% in water |

Wheels were tested as manufactured and following a two day soak in coolant to simulate long term exposure to coolant during grinding and to evaluate the water resistance properties of the test wheels. Results for humidity cured, standard wheels and wheels initially water saturated are shown in Table 5A. (MMR represents material removal rate.) Hioki Power data for standard and humidity-cured wheels are shown in Table 5B. The surface grinding data indicated that test wheels manufactured by the method of the present invention had improved G-Ratio retention of up to 90%. In addition, these wheels achieved steady state grinding conditions early in the grinding process.

TABLE 5A

Percent Retention in G-Ratio Before and After Exposure Water-Based Coolant (2 day soak in coolant) using white fused alundum abrasive

| Cure | Low MRR (0.025 mm (0.001")) Infeed Rate | | High MMR (0.051 mm (0.002")) Infeed Rate | |
|---|---|---|---|---|
| Variation ↓ Specimen # → | #3A (I-Grade) | #4A (K-Grade) | #3A (I-Grade) | #4A (K-Grade) |
| Standard | 67.8 | 54.3 | 53.7 | 41.9 |
| Humidity Cure | 89.1 | 87.3 | 92.6 | 86.3 |
| Initially Water Saturated | 57.1 | 55.2 | 44.8 | 42.2 |

TABLE 5B

Hioki Power (kWh) of BOND A-Type Wheels in Surface Grinding Test

| Cure | Low MRR (0.025 mm Infeed) | | High MMR (0.051 mm Infeed) | |
|---|---|---|---|---|
| Variation ↓ Specimen # → | #3A (I-Grade) | #4A (K-Grade) | #3A (I-Grade) | #4A (K-Grade) |
| Standard | 0.0615 | 0.0729 | 0.0288 | 0.0382 |
| Humidity Cure | 0.0549 | 0.0646 | 0.0314 | 0.0327 |
| Initially Water Saturated | 0.540 | 0.0689 | 0.0299 | 0.0346 |

Example 6

The use of premium seeded gel (SG) alumina abrasive in organic bonded abrasive products was investigated in surface slot grinding. A 30/70 blend by weight of premium (sintered) seeded sol gel alpha alumina grain with 38A alundum grain, both obtained from Saint-Gobain Ceramics & Plastics, Inc., was employed to form standard wheels. Wheels cured using conventionally technology were evaluated against wheels cured using the humidity controlled bake cycle described in Example 2.

Specimens were prepared as follows:

Bond A, Specimen #5A

| COMPONENT | WEIGHT (g) or VOLUME (cm$^3$) |
|---|---|
| Abrasive, seeded gel 60 grit (406 microns) | 487.1 g |
| Aminopropyl triethoxy silane, 6% (v/v) in water | 9 cm$^3$ |
| Abrasive, 38A alundum 60 grit (406 microns) | 1151.2 g |
| Aminopropyl triethoxy silane, 2% (v/v) in water | 20 cm$^3$ |
| LPR | 21.1 g |
| BOND A (rubber modified phenolic resin) | 84.5 g |
| TDA | 20 cm$^3$/lb resin |

| Properties | Values |
|---|---|
| wheel density | 2.178 g/cm$^3$ |
| wheel grade & structure | D-6 |

| Composition | Volume % |
|---|---|
| Abrasive | 52 |
| Bond | 10.3 |
| Porosity | 37.7 |

Bond A, Specimen #6A

| COMPONENT | WEIGHT (g) or VOLUME (cm$^3$) |
|---|---|
| Abrasive, seeded gel 60 grit (406 microns) | 487.1 g |
| Aminopropyl triethoxy silane, 6% (v/v) in water | 9 cm$^3$ |
| Abrasive, 38A alundum 60 grit (406 microns) | 1151.2 g |
| Aminopropyl triethoxy silane, 2% (v/v) in water | 20 cm$^3$ |
| LPR | 26.7 g |
| TDA | 20 cm$^3$/lb resin |
| BOND A (rubber modified phenolic resin) | 106.6 g |

| Properties | Values |
|---|---|
| wheel density | 2.213 g/cm$^3$ |
| wheel grade & structure | G-6 |

| Composition | Volume % |
|---|---|
| Abrasive | 52 |
| Bond | 13 |
| Porosity | 35 |

Molded wheel dimensions were 5.125 (130.175 mm)×0.373 (9.47 mm)×1" (25.40 mm). Wheels were finished to a size of 5" (127.00 mm)×0.25 (6.35 mm)×1.25" (31.75 mm) for the test.

Wheels were tested as manufactured and following a 2 day soak in coolant to simulate the long-term effects of coolant (Master Chemical Trim SC210 semi synthetic coolant used at 5% in water) degradation on the bonded abrasive product. Wheels were tested under the machine set-up conditions shown below.

| Machine | Brown & Sharpe Surface Grinder |
|---|---|
| Wheel Speed | 5730 R.P.M. (7500 S.F.P.M.) |
| Table Traverse | 50 F.P.M. (15240 mm/min) |
| Unit Crossfeed | 0.180 IN |
| Unit/Total Downfeed | 1.0 mm/50 mm 54340 steel removed |
| | 2.0 mm/50 mm 4340 steel removed |
| Pre-Grind | 1.0 mm/30 mm 4340 steel removed |
| | 2.0 mm/30 mm 4340 steel removed |
| Material Type | 4340 steel |
| Rockwell Hardness | 48 Rc |
| Diamond Point Dresser | 0.025 mm dress depth |
| Coolant | Master Chemical Trim SC210 semi-synthetic, 5% in water |

The results for this test are reported in Tables 6A and 6B. These results indicate that wheels processed under humidity-induced thermal cure conditions outperform the standard product by greater than 50% in surface grinding. G-Ratio retention following exposure to coolant was near or greater than 90% under various grinding conditions in hard and soft grades. The power data illustrating both standard and wheels thermally cured in an atmosphere comprising humidity operated in the same power regimes.

TABLE 6A

Percent Retention in G-Ratio Before and After Exposure Water-Based Coolant (2 day soak in coolant) using seeded sol gel (SG) alumina abrasive grain

| Cure | Low MRR (0.025 mm Infeed) | | High MMR (0.051 mm Infeed) | |
|---|---|---|---|---|
| Variation, ↓ Specimen # → | #5A (D-Grade) | #6A (G-Grade) | #5A (D-Grade) | #6A (G-Grade) |
| Standard | 59.0 | 62.4 | 64.5 | 66.5 |
| Humidity Cure | 93.7 | 90.6 | 89.5 | 92.7 |

TABLE 6B

Hioki Power (kWh) of BOND A-Type Wheels in Surface Grinding Test

| Cure | Low MRR (0.025 mm Infeed) | | High MMR (0.051 mm Infeed) | |
|---|---|---|---|---|
| Variation, ↓ Specimen # → | #5A (D-Grade) | #6A (G-Grade) | #5A (D-Grade) | #6A (G-Grade) |
| Standard | 0.0251 | 0.0431 | 0.0127 | 0.0214 |
| Humidity Cure | 0.0194 | 0.029 | 0.0096 | 0.0174 |

Example 7

A series of 5" (127.00 mm)×2" (50.8 mm)×1.5" (38.10 mm) cup wheels were made for broad area contact surface grinding on a vertical spindle grinder.

BOND C

| COMPONENT | WEIGHT % |
|---|---|
| Rubber modified resin used in BOND A | 42.73 |
| Fluorspar (Calcium Fluoride) | 33.17 |
| Bubbled Mullite | 24.10 |

BOND C, Specimen #1C

| COMPONENT | WEIGHT lbs (Kg) |
|---|---|
| Silane-pretreated 38A alundum abrasive, 60 grit (406 micron) | 30.52 g (13.8) |
| LPR | 0.48 g (0.22) |
| BOND C | 4.00 g (1.81) |

| Properties | Values |
|---|---|
| wheel density | 2.0836 g/cm³ |
| wheel grade & structure | H-9 |

| Composition | Volume % |
|---|---|
| Abrasive | 46 |
| Bond | 20.1 |
| Porosity | 33.9 |

BOND C, Specimen #2C

| COMPONENT | WEIGHT lbs (Kg) |
|---|---|
| Silane-pretreated 38A alundum abrasive, 60 grit (406 micron) | 30.08 (13.42) |
| LPR | 0.52 (0.24) |
| BOND C | 4.40 (2.19) |

| Properties | Values |
|---|---|
| wheel density | 2.1141 g/cc |
| wheel grade & structure | J-9 |

| Composition | Volume % |
|---|---|
| Abrasive | 46 |
| Bond | 22.4 |
| Porosity | 31.6 |

EXAMPLE 5C, BOND C, Specimen #3C

| COMPONENT | WEIGHT lbs (Kg) |
|---|---|
| Silane-pretreated 38A alundum abrasive, 60 grit (406 micron) | 29.60 (13.42) |
| LPR | 0.57 (0.26) |
| BOND C | 4.83 (2.19) |

| Properties | Values |
|---|---|
| wheel density | 2.1486 g/cc |
| wheel grade & structure | L-9 |

| Composition | Volume % |
|---|---|
| Abrasive | 46 |
| Bond | 25.0 |
| Porosity | 29.0 |

Wheels were cured using either the standard (conventional) cure cycle described in Example 1 or the humidity controlled cure cycle described in Example 2.

Wheels were tested as manufactured and following a 5 day soak in coolant to simulate the long-term effects of coolant degradation on the bonded abrasive product using the machine set-up conditions for broad contact area grinding shown below, where R.P.M. stands for rotations per minute, S.F.P.M. stands for square feet per minute:

| Machine Type | Vertical Spindle |
|---|---|
| Wheel Speed | 4202 R.P.M. (5500 S.F.P.M.) |
| Work Speed | 8 R.P.M. (0.5 M.P.H.) |
| Feed Rate | 0.0015 I.P.R. |
| | 0.0027 I.P.R. |
| Spark Out | 3 SEC |
| Pre-Grind | 1–5 MIN |
| Material Type | AISI 1070 |

-continued

| Machine Type | Vertical Spindle |
|---|---|
| Rockwell Hardness | <24–26 Rc |
| Coolant | Trim Clear, 2% in Water |

The results are shown in Tables 7A and 7B below.

TABLE 7A

Percent Retention in G-Ratio Before and After Exposure Water-Based Coolant (5 day soak in coolant) in Broad Contact Area Grinding

| Cure | Low MRR (0.038 mm (0.0015") Infeed Rate) | | | High MRR (0.069 mm (0.0027") Infeed Rate) | | |
|---|---|---|---|---|---|---|
| Variation ↓ Specimen # → | #1C H-Grade | #2C J-Grade | #3C L-Grade | #1C H-Grade | #2C J-Grade | #3C L-Grade |
| Standard | 63.6 | 59.7 | 65.7 | 64.0 | 61.8 | 66.7 |
| Humidity Cure | 100.0 | 100.0 | 97.5 | 100.0 | 100.0 | 98.0 |

TABLE 7B

Average Power (kW) of BOND C-Type Test Wheels in Broad Area of Contact Face Grinding Test

| Cure | Low MRR 0.038 mm (0.0015") Infeed Rate | | | High MRR (0.069 mm (0.0027") Infeed Rate) | | |
|---|---|---|---|---|---|---|
| Variation ↓ Specimen # → | #1C H-Grade | #2C J-Grade | #3C L-Grade | #1C H-Grade | #2C J-Grade | #3C L-Grade |
| Standard | 6.11 | 7.08 | 7.90 | 6.86 | 8.20 | 8.72 |
| Humidity Cure | 5.59 | 7.23 | 10.6 | 6.04 | 7.83 | 9.02 |

The results in Tables 7A and 7B clearly showed that bonded abrasive products cured under high humidity conditions (90% at 95° C. to 15% at 160° C.) exhibited strong resistance to degradation by coolant in disc grinding applications. The data shown

| BOND A, Specimen #7A | |
|---|---|
| COMPONENT | WEIGHT lbs (Kg) |
| Silane-pretreated 38A alundum abrasive, 24 grit (1035 micron) | 78.61 g (35.65) |
| LPR | 1.01 g (0.46) |
| BOND A | 4.04 g (1.83) |
| Properties | Values |
| wheel density | 2.186 g/cm³ |
| wheel grade & structure | D-6 |
| Composition | Volume % |
| Abrasive | 52 |
| Bond | 10.3 |
| Porosity | 37.7 |

| BOND C, Specimen #4C | |
|---|---|
| COMPONENT | WEIGHT lbs (Kg) |
| Silane-pretreated 38A alundum abrasive, 24 grit (1035 micron) | 37.51 g (17.01) |
| LPR | 0.31 g (0.14) |
| BOND C | 2.18 g (0.99) |
| Properties | Values |
| wheel density | 2.191 g/cm³ |
| wheel grade & structure | D-6 |
| Composition | Volume % |
| Abrasive | 50 |
| Bond | 12.5 |
| Porosity | 37.5 |

Procedure for Qualification of Wheels using Wet Burst Strength Criteria

Burst test wheels (12" (304.79 mm×1" (25.4 mm)×4" (101.60 mm)) were made in Bond C and in Bond A, described, respectively, in Examples 7 and 1. Soft grade and coarse grit was used to test the wet burst strength. These tests were performed using 38A abrasive, known for having poor wet strength, in both BOND C and in BOND A. The test specification for surface grinding applications was BOND A, Specimen #7A and, for disc grinding applications, BOND C, Specimen #4C. The standard products were prepared by conventional wrapping described above. Minimum qualification speeds and wet burst data are shown in Table 8.

A 35% increase in wet burst speed was observed in the experimental product over the standard product for the surface grinding specification. A 9% increase in wet burst speed in disc grinding was observedin the wheel thermally cured in an atmosphere comprising humidity over the standard wheel.

TABLE 8

Wet Burst Data and Minimum Qualification Speeds for Surface and Disc Grinding Specifications.

| | | | Standard Product | | | |
|---|---|---|---|---|---|---|
| | | | Standard | Standard | Humidity Cured | |
| BOND/ SPECIMEN # | Operating Speed (SFPM) | Minimum Qualification Speed[1] | Burst Speed (rpm) | Burst Speed (SFPM) | Burst Speed (rpm) | Burst Speed (SFPM) |
| BOND A, Specimen #7A | 9500 | 16765 | 4000 | 12575 | 5375 | 16900 |

TABLE 8-continued

Wet Burst Data and Minimum Qualification Speeds for Surface and Disc Grinding Specifications.

| | | | Standard Product | | | |
| --- | --- | --- | --- | --- | --- | --- |
| | | | Standard | Standard | Humidity Cured | |
| BOND/ SPECIMEN # | Operating Speed (SFPM) | Minimum Qualification Speed[1] | Burst Speed (rpm) | Burst Speed (SFPM) | Burst Speed (rpm) | Burst Speed (SFPM) |
| BOND C, Specimen #4C | 6000 | 10588 | 3425 | 10770 | 3735 | 11740 |

[1]Tested Wet only. Qualification Speed = (Operation Speed × 1.5)/0.85

Example 9

Both standard samples and samples thermally cured in an atmosphere comprising humidity were prepared according to the procedure described in Example 5. (Bond A, Specimens #3A and 4A). Resultant samples were placed in a pressurized extraction vessel (autoclave) with water to extract ammonia from the samples. The autoclave was removed from the oven and quench cooled before opening the reactor. Ammonia levels in the resulting aqueous extract were analyzed using EPA Method 351.3 for Total Kjeldahl Nitrogen (TKN). The results are shown in Table 9.

TABLE 9

Results of Ammonia Analysis on Samples Cured by Standard Process vs. Humidity Cure

| Sample | Ammonia Concentration mg/L |
| --- | --- |
| Specimen #3A Standard Cured | 103 |
| Specimen #3A Humidity Cured | 20 |
| Specimen #4A Standard Cured | 112 |
| Specimen #4A Humidity Cured | 21 |

Ammonia concentration is reported in mg/L (ppm). It represents the amount of ammonia extracted from a 1000 g wheel segment in a controlled volume of water (1000 cm$^3$).

Equivalents

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for producing an organically bonded abrasive article, comprising the steps of:
   a) combining an abrasive grain component and a phenolic resin component;
   b) molding the combined components;
   c) thermally curing the phenolic resin component for the entire period during which the phenolic resin component polymerizes in an atmosphere comprising humidity, wherein the atmosphere has a relative humidity which exceeds normal relative humidity at a given temperature, wherein said atmosphere contacts the molded components, thereby producing the organically bonded abrasive article.

2. The method of claim 1, wherein the abrasive grain component is an alumina grain.

3. The method of claim 1, wherein the phenolic resin component includes a phenolic resin in liquid form.

4. The method of claim 1, wherein the phenolic resin component includes a resole.

5. The method of claim 4, wherein the resole is dissolved in water.

6. The method of claim 1, wherein the phenolic resin component includes a novolac resin.

7. The method of claim 1, wherein the method further comprises combining an organosilicon component with at least one of the abrasive grain component and the phenolic resin component of step a).

8. The method of claim 7, wherein the abrasive grain component is combined with the organosilicon component to form organosilicon-treated abrasive grain and then combined with the phenolic resin component.

9. The method of claim 8, wherein the organosilicon-treated abrasive grain is first combined with a phenolic resin in liquid form and then with a phenolic resin in powder form.

10. The method of claim 7, wherein the organosilicon component is combined with the phenolic resin component and then with the abrasive grain.

11. The method of claim 1, wherein thermal curing is at a final cure temperature of at least about 150° C.

12. The method of claim 1, wherein said atmosphere further includes air.

13. The method of claim 1, wherein said atmosphere further includes ammoma.

14. The method of claim 1, wherein thermal curing is conducted in the presence of steam.

15. The method of claim 14, wherein thermal curing is conducted in the presence of live steam.

16. The method of claim 15, wherein thermal curing is conducted in a chamber and the steam is re-circulated through the chamber.

17. The method of claim 1, wherein said atmosphere is in contact with the molded components for a period of at least 5 hours.

18. The method of claim 1, wherein said atmosphere contacts the combined components prior to thermally curing the phenolic resin component.

19. The method of claim 1, wherein the thermal curing is in a chamber held at a pressure exceeding atmospheric pressure.

20. An abrasive wheel produced by a process comprising the steps of:

a) combining an abrasive grain component and an organosilicon component to form an organosiicon-treated abrasive grain component;

b) combining the organosilicon-treated abrasive grain component with a phenolic resin component;

c) molding the combined components to form a green body; and d) thermally curing the phenolic resin component, in an atmosphere comprising humidity, wherein said atmosphere contacts the green body, thereby producing the abrasive wheel, having at least a 9 percent improvement in burst speed with respect to a standard wheel, of the same specification as said abrasive wheel.

21. A grinding wheel produced by a process, comprising the steps of:

a) combining an abrasive grain component and an organosilicon component to form an organosilicon-treated abrasive grain component;

b) combining the organosilicon-treated abrasive grain component with a phenolic resin component;

c) molding the combined components to form a green body; and d) thermally curing the phenolic resin component, in an atmosphere comprising humidity, wherein said atmosphere contacts the green body, thereby producing the grinding wheel, whereby the wheel has a percent wet strength retention of at least about 89.9 percent.

* * * * *

UNITED STATES PATENT AND TRADEMARK OFFICE
CERTIFICATE OF CORRECTION

PATENT NO. : 6,949,129 B2
DATED : September 27, 2005
INVENTOR(S) : Mark W. Simon It is certified that error appears in the above-identified patent and that said Letters Patent is hereby corrected as shown below:

Column 22,
Line 48, delete "ammoma" insert -- ammonia --.

Signed and Sealed this

Sixth Day of December, 2005

JON W. DUDAS
*Director of the United States Patent and Trademark Office*